(12) United States Patent
Campbell

(10) Patent No.: US 7,317,385 B2
(45) Date of Patent: Jan. 8, 2008

(54) IN-VEHICLE ANIMATION BYPASS SYSTEM AND METHOD

(75) Inventor: Douglas C. Campbell, Northville, MI (US)

(73) Assignee: Johnson Controls Technology Company, Holland, MI (US)

( * ) Notice: Subject to any disclaimer, the term of this patent is extended or adjusted under 35 U.S.C. 154(b) by 213 days.

(21) Appl. No.: 11/195,112

(22) Filed: Aug. 2, 2005

(65) Prior Publication Data

US 2007/0030133 A1 Feb. 8, 2007

(51) Int. Cl.
*B60Q 1/00* (2006.01)
(52) U.S. Cl. .................................... 340/438; 340/575
(58) Field of Classification Search ............... 340/438, 340/575; 701/33, 29
See application file for complete search history.

(56) References Cited

U.S. PATENT DOCUMENTS

| | | | |
|---|---|---|---|
| 4,787,040 A | 11/1988 | Ames et al. | |
| 5,541,572 A | 7/1996 | Okamoto | |
| 5,945,745 A | 8/1999 | Macks | |
| 6,025,655 A | 2/2000 | Hopf | |
| 6,434,450 B1 | 8/2002 | Griffin, Jr. et al. | |
| 6,441,726 B1 | 8/2002 | Voto et al. | |
| 6,575,607 B1 | 6/2003 | Klemish et al. | |
| 6,693,523 B1 | 2/2004 | Abel et al. | |
| 2002/0193925 A1* | 12/2002 | Funkhouser et al. | 701/33 |
| 2003/0201895 A1 | 10/2003 | Harter, Jr. et al. | |
| 2004/0075538 A1 | 4/2004 | Flick | |
| 2004/0095255 A1 | 5/2004 | Namaky et al. | |

FOREIGN PATENT DOCUMENTS

| | | |
|---|---|---|
| DE | 10 2004 054 697 | 6/2006 |
| EP | 0 672892 | 9/1995 |
| WO | WO 03/039914 | 5/2003 |
| WO | WO 03/057523 A1 | 7/2003 |

OTHER PUBLICATIONS

International Search Report for PCT/US2006/029938; date of mailing Jan. 5, 2007; 2 pages.

* cited by examiner

*Primary Examiner*—Jeffery Hofsass
*Assistant Examiner*—Shirley Lu
(74) *Attorney, Agent, or Firm*—Foley and Lardner LLP

(57) ABSTRACT

A system and method for bypassing an animation sequence of a vehicle display system may comprise starting an animation sequence at an in-vehicle display, interrupting the animation sequence in response to a user-initiated input, and displaying a final state of the animation sequence.

23 Claims, 6 Drawing Sheets

IN-VEHICLE ANIMATION BYPASS SYSTEM AND METHOD

FIELD

The present invention generally relates to in-vehicle displays, such as instrument clusters, center stack displays, and overhead displays. In particular, the present invention relates to a system and method for bypassing an animation sequence of an in-vehicle display.

BACKGROUND

Many different types of in-vehicle displays, such as instrument clusters, center stack displays, overhead displays, etc. include animation sequences that function during operation of a vehicle. For example, many instrument clusters are designed to include animation sequences that begin at vehicle start-up. In many cases, an animation sequence may last for several seconds after vehicle start-up. In some cases, vehicle operators may desire to bypass any outstanding events in an animation sequence and immediately display the true readings measured of the instrument cluster (or other in-vehicle displays) before the animation sequence has performed its complete process and has ended. Accordingly, there is a need for a vehicle system and method that enables a vehicle operator to utilize user-initiated input to bypass an animation sequence of an in-vehicle display.

SUMMARY

One exemplary embodiment relates to a method for bypassing an animation sequence of a vehicle display system comprising starting an animation sequence at an in-vehicle display, interrupting the animation sequence in response to a user-initiated input, and displaying a final state of the animation sequence.

Another exemplary embodiment relates to a method for bypassing an animation sequence of a vehicle display system comprising providing an in-vehicle display configured to display a sequence of animations ending with a display of sensed vehicle data and expediting the display of the sensed vehicle data in response to a user-initiated input.

Another exemplary embodiment relates to a vehicle display system comprising an in-vehicle display configured to display an animation sequence and a control unit configured to control the display and to interrupt the animation sequence in response to a user-initiated input.

DETAILED DESCRIPTION

Figure 1:
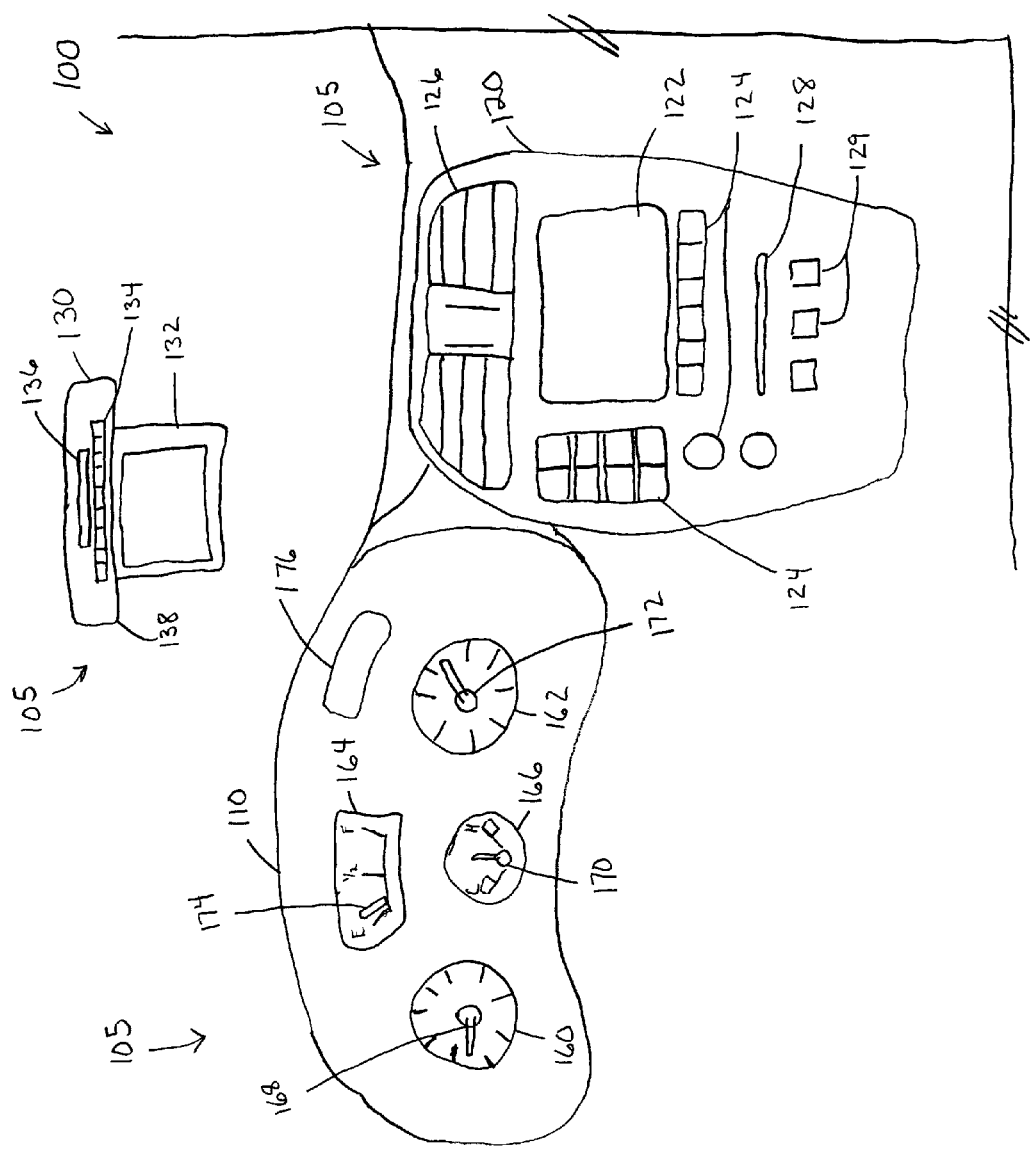
FIG. 1 is a partial front plan view of a vehicle interior according to an exemplary embodiment.

Referring to FIG. 1, a partial view of a vehicle interior 100 is shown according to an exemplary embodiment. Vehicle interior 100 comprises a plurality of in-vehicle displays 105, including an instrument cluster 110, a center stack 120, and an overhead video display unit 130. Instrument cluster 110 is an assemblage of parts configured to provide automobile data from a plurality of automobile systems to an operator of the automobile and/or to passengers of the automobile. As shown in FIG. 1, instrument cluster 110 comprises gauges 160, 162, 164, and 166 which include gauge pointers 168, 170, 172 and 174. Instrument cluster 110 also comprises a display 176 for displaying various information regarding the vehicle (e.g., vehicle condition). Gauges 160, 162, 164, and 166 may be configured to become lighted through any suitable means including, but not limited to, backlighting. Gauge pointers 168, 170, 172 and 174 may be configured to move to a position corresponding to a vehicle condition (e.g., a gauge pointer may be configured to move to a position corresponding to the vehicle engine revolutions per minute (RPMs)). Center stack 120 may comprise a display 122 (e.g., center stack video), video controls 124 (e.g., volume, display settings, etc.), vents 126, media player 128 (e.g., DVD player, VCP player, CD player, cassette player, etc.), media controls 129, etc. Display 122 may be configured to display video as well as other information such as vehicle information (e.g., temperature, navigation, communications, vehicle condition, etc.). Overhead video display unit 130 may comprise a video display screen 132, video controls 134 (e.g., volume, display settings, etc.), media player 136 (e.g., DVD player, VCP player, CD player, etc.), and housing 138 (e.g., frame, base, etc.).

Instrument cluster 110, center stack 120 and overhead video display unit 130 (and other in-vehicle displays) may be configured to display an animation sequence. The term "animation sequence" as used herein shall mean any permutation of two or more events sequentially performed at an in-vehicle display. The animation sequence may comprise the same sequence of events that is started upon vehicle start-up. Alternately, the animation sequence may comprise a sequence of events that is different than the sequence of events previously displayed at vehicle start-up. According to an exemplary embodiment, an event performed at instrument cluster 110 may include pointers (e.g., gauges 160, 162, 164, 166, gauge pointers 168, 170, 172, 174, etc.) moving to maximum values and returning to minimum values, a vehicle "walk-around" via display 176 (e.g., tire pressure display, near-obstacle detection, outside temperature, compass heading, etc.), lighting of each tell-tale (e.g., one at a time, together, etc.), etc. According to an exemplary embodiment, an event performed at center stack 120 may include a visual effect at display 122 (e.g., changing brightness and/or colors, displaying various images, displaying vehicle information, etc.). According to an exemplary embodiment, an event performed at overhead video display unit 130 may include a visual effect at video screen 132 (e.g., changing brightness and/or colors, displaying various images, displaying vehicle information, etc.).

Figure 2A:
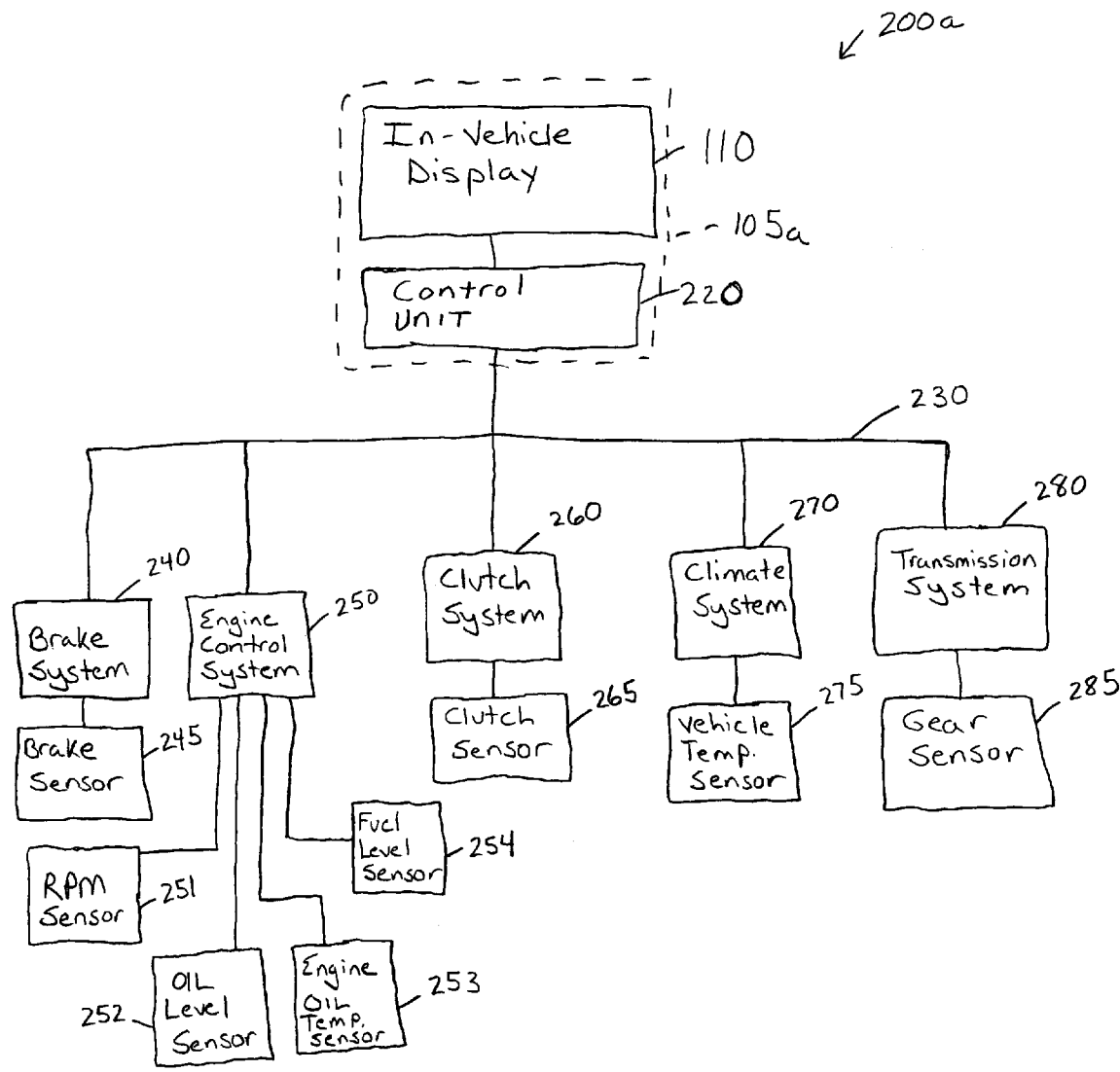
FIG. 2A is a block diagram of a vehicle system for bypassing an animation sequence according to an exemplary embodiment.

FIG. 2A is a block diagram of a vehicle system 200a configured to bypass an animation sequence performed at an in-vehicle display, such as instrument cluster 110, according to an exemplary embodiment. Vehicle system 200a may comprise instrument cluster 110 having a control unit 220, a vehicle communication bus 230 and one or more vehicle systems. Control unit 220 controls or drives one or more of the gauges, pointers, displays, etc. of instrument cluster 110. Control unit 220 may also be configured to communicate over vehicle communication bus 230 with one or more vehicle systems 240, 250, 260, 270 and 280. According to various exemplary embodiments, the control unit may be configured to communicate with vehicle systems according to any suitable configuration (e.g., wires, wireless, etc.). A vehicle system may be any vehicle system configured to aid in operation of the vehicle, including, but not limited to, brake system 240, engine control system 250, clutch system 260, climate system 270 and transmission system 280. According to an exemplary embodiment, control unit 220 may be integrally formed as part of instrument cluster 110 (e.g., as shown by box 105a). The control unit may comprise one or more analog and/or digital electrical or electronic components, and may include a microprocessor, microcontroller, application-specific integrated circuit (ASIC), programmable logic, and/or other circuit elements. According to various exemplary embodiments, the control unit may comprise a printed circuit board, a flexible circuit board, a rigid circuit board, conductive foil, and/or other suitable form. The control unit may comprise an algorithm or set of machine-executable instructions that may be utilized in conjunction with a microprocessor and memory of the instrument cluster, discrete logic, or other circuit elements. According to an alternative embodiment, the control unit may be a separate device (e.g., as part of one of systems 240-280, or as a separate control unit) from the instrument cluster (e.g., the control unit may comprise a separate processor, memory and/or logic from the instrument cluster processor, memory and logic).

Brake system 240 may be configured to communicate with a brake sensor 245 which is configured to detect and communicate whether the vehicle brake pedal has been depressed. Engine control system 250 may be configured to communicate with one or more engine condition sensors including, but not limited to, a revolution per minute (RPM) sensor 251, an oil level sensor 252, and an engine oil temperature sensor 253. RPM sensor 251 may be configured to detect and communicate the engine's revolutions per minute. Oil level sensor 252 may be configured to detect and communicate the engine oil level. Engine oil temperature sensor 253 may be configured to detect and communicate the engine oil temperature. Fuel level sensor 254 may be configured to detect and communicate the vehicle fuel level. Clutch system 260 may be configured to communicate with a clutch sensor 265 which is configured to detect and communicate whether the vehicle clutch has been depressed. Vehicle climate system 270 may be configured to communicate with vehicle temperature sensor 275 which is configured to detect and communicate the temperature of the interior of the vehicle and whether the temperature has been adjusted. Transmission system 280 may be configured to communicate with a gear shift sensor 285 which is configured to detect and communicate the gear in which the transmission has been maneuvered.

Figure 2B:
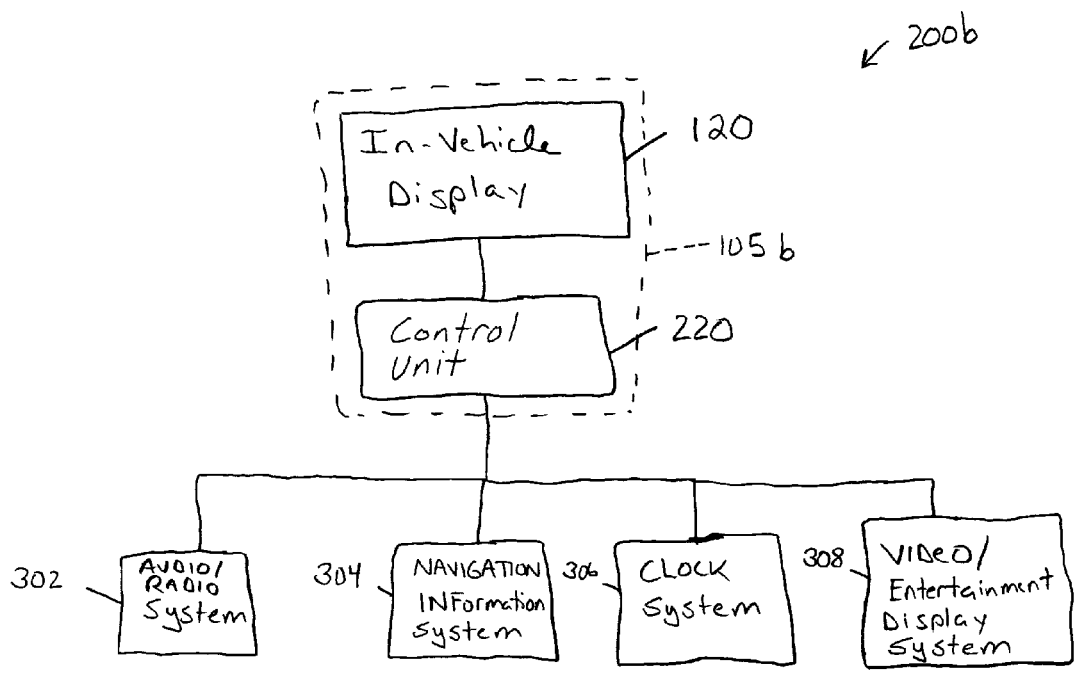
FIG. 2B is a block diagram of a vehicle system for bypassing an animation sequence according to an exemplary embodiment.

FIG. 2B is a block diagram of a vehicle system 200b configured to bypass an animation sequence performed at an in-vehicle display, such as center stack 120, according to an exemplary embodiment. Vehicle system 200b may comprise center stack 120 having a control unit 220, vehicle communication bus 230 and one or more vehicle systems. Control unit 220 controls one or more of the visual effects of the display of center stack 120. Control unit 220 may also be configured to communicate over vehicle communication bus 230 with one or more vehicle systems 302, 304, 306 and 308. According to various exemplary embodiments, the control unit may be configured to communicate with vehicle systems according to any suitable configuration (e.g., wires, wireless, etc.). A vehicle system may be any vehicle system configured to aid in operation of the vehicle, provide information about the vehicle, provide entertainment/information for a passenger, etc. As shown in FIG. 2B, the vehicle systems comprise audio radio system 302, navigation information system 304, clock system 306 and video/entertainment display system 308. According to an exemplary embodiment, control unit 220 may be integrally formed as part of center stack 120 (e.g., as shown by box 105b and as described above with reference to FIG. 2A). According to an alternative embodiment, the control unit may be a separate device (e.g., as part of one of systems 302-308, or as a separate control unit) from the center stack (e.g., the control unit may comprise a separate processor, memory and/or logic from the center stack processor, memory and logic).

Figure 2C:
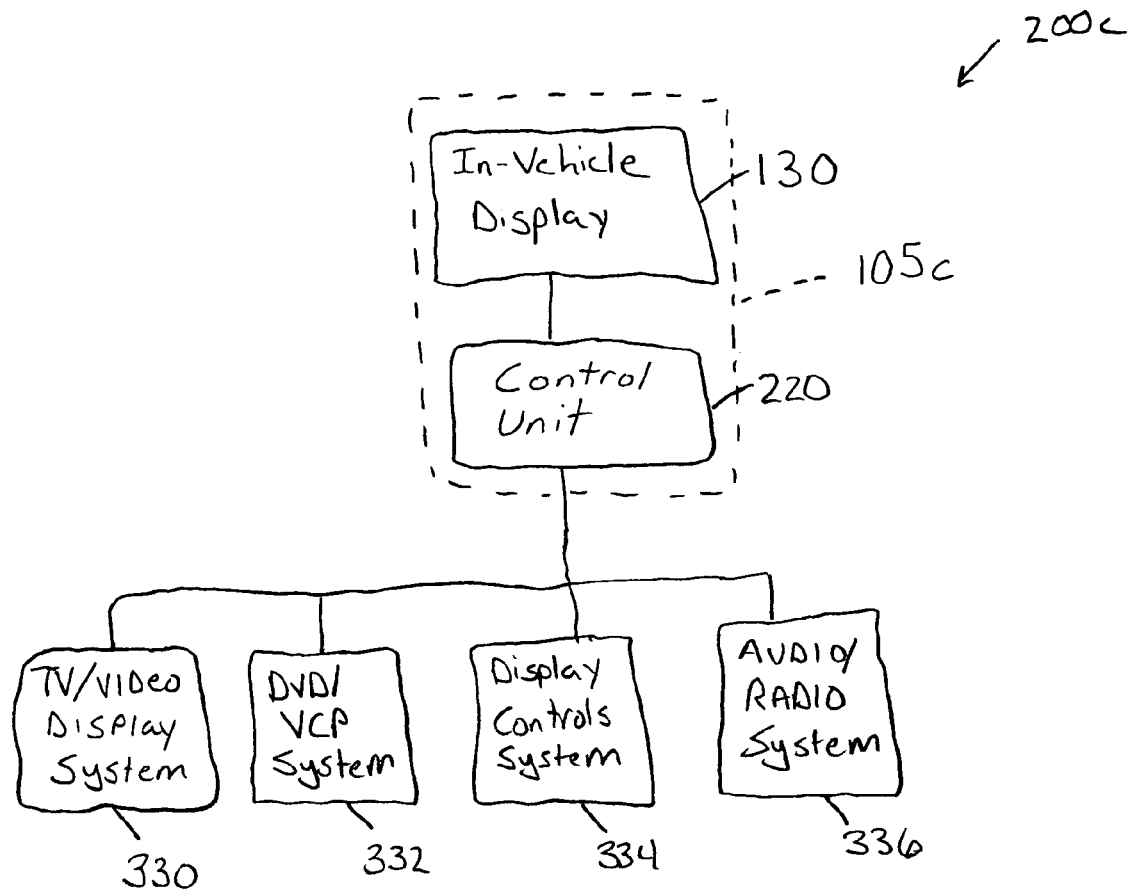
FIG. 2C is a block diagram of a vehicle system for bypassing an animation sequence according to an exemplary embodiment.

FIG. 2C is a block diagram of a vehicle system 200c configured to bypass an animation sequence performed at an in-vehicle display, such as overhead video display unit 130, according to an exemplary embodiment. Vehicle system 200c may comprise overhead video display unit 130 having a control unit 220, vehicle communication bus 230 and one or more vehicle systems. Control unit 220 controls one or more visual effects of the video display of overhead display unit 130. Control unit 220 may also be configured to communicate over vehicle communication bus 230 with one or more vehicle systems 330, 332, 334, 336. According to various exemplary embodiments, the control unit may be configured to communicate with vehicle systems according to any suitable configuration (e.g., wires, wireless, etc.). A vehicle system may be any vehicle system configured to aid in operation of the vehicle, provide information about the vehicle, provide entertainment/information for a passenger, etc. As shown in FIG. 2C, the vehicle systems comprise TV/video display system 330, DVD/VCP system 332, display controls system 334, and audio/radio system 336. According to an exemplary embodiment, control unit 220 may be integrally formed as part of overhead display unit 130 (e.g., as shown by box 105c and as described above with reference to FIG. 2A). According to an alternative embodiment, the control unit may be a separate device (e.g., as part of one of systems 330-336, or as a separate control unit) from the overhead display unit 130 (e.g., the control unit may comprise a separate processor, memory and/or logic from the overhead display unit processor, memory and logic).

Figure 3:
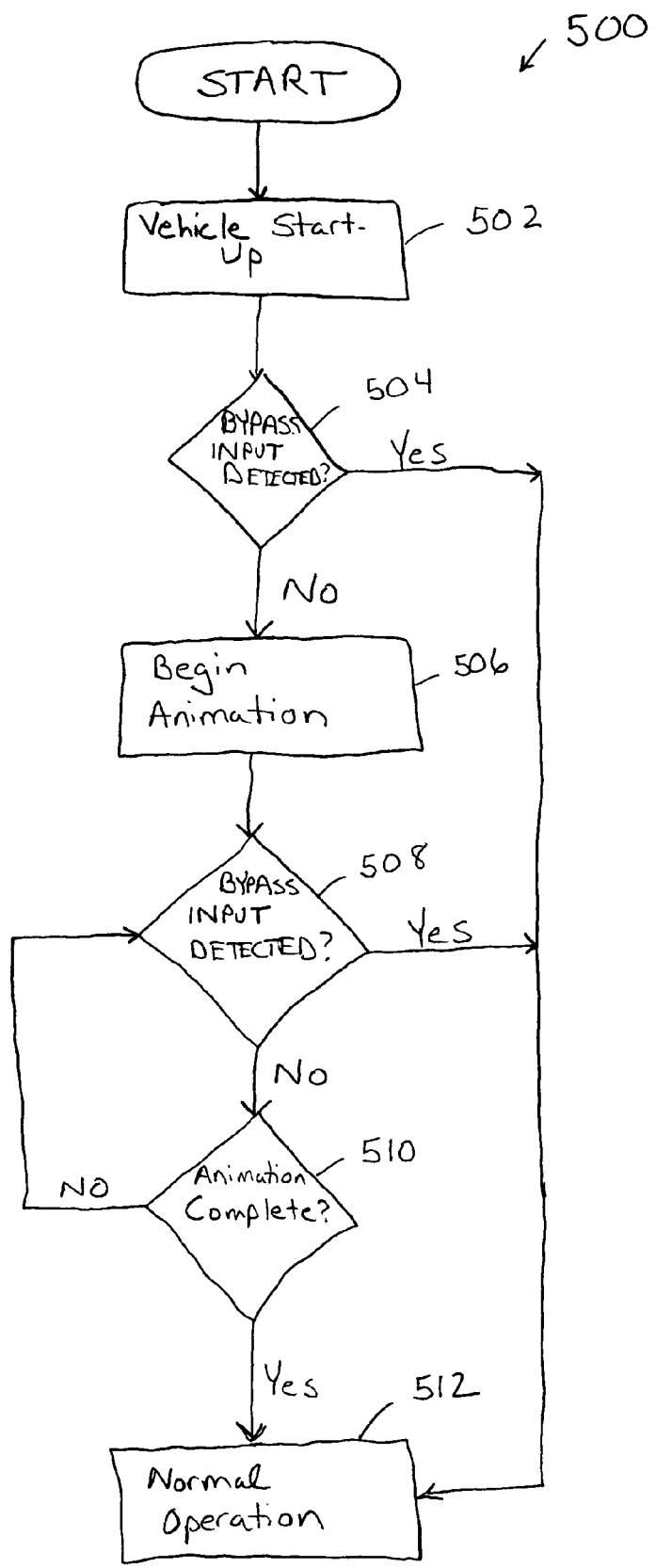
FIG. 3 is a flowchart illustrating a process for bypassing an animation sequence according to an exemplary embodiment.

According to an exemplary embodiment, control unit 220 of vehicle systems 200a, 200b and 200c is configured to perform methods of bypassing an animation sequence performed at in-vehicle display 105 such as instrument cluster 110, center stack 120, and overhead video display unit 130 described in FIGS. 1, 2A, 2B, 2C. FIG. 3 is a flowchart showing a process 500 for bypassing an animation sequence, according to an exemplary embodiment. Process 500 begins with a vehicle start-up (step 502). For example, a vehicle start-up may include an ignition key being turned, an engine starting, vehicle controls operating, etc. Once vehicle start-up has occurred, a determination is made whether a bypass input is detected (step 504). The animation sequence may be bypassed and/or expedited if control unit 220 receives one or more predetermined signals resultant from a predetermined user-initiated input and/or actuation of a user-actuated switch. If a bypass signal is detected, the process proceeds to normal operation (step 512) by bypassing the animation sequence (e.g., skipping one or more steps in the sequence and/or expediting the sequence). If a bypass signal is not detected at step 504, an animation sequence begins (step 506). A determination is then made whether a bypass input is detected (step 508). Once the animation sequence begins, it may be interrupted and/or expedited and the outstanding events in the animation sequence bypassed if control unit 220 receives one or more predetermined signals resultant from a predetermined user-initiated input and/or actuation of a user-actuated switch. If a bypass signal is detected, the process proceeds to normal operation (step 512) by bypassing the animation sequence (e.g., by skipping one or more steps in the sequence and/or expediting the sequence). If no bypass input is detected, a determination is made whether the animation sequence is complete (step 510). If the sequence is complete, the process proceeds to normal operation (step 512). If the sequence is not complete, the process returns to step 508 where steps 508, 510 may be repeated until step 512 is reached.

According to an exemplary embodiment, bypass input may comprise a predetermined user-initiated input performed by a user for the purpose of vehicle control (steps 504, 508) and/or an actuation of a user-actuated switch (steps 504, 508) which may be detected by control unit 220. According to an exemplary embodiment, upon detecting the bypass input, control unit 220 interrupts the animation sequence at the current state of the animation sequence (or before the animation sequence begins). According to an exemplary embodiment, a user-initiated input performed by the user for the purpose of vehicle control may result from any number of actions for vehicle control or vehicle motion control, including, but not limited to, a user depressing a brake pedal, a user depressing a clutch, a user releasing an emergency brake, a user actuating an accelerator pedal, a user maneuvering a gear shift, a user turning the steering wheel, a user turning on vehicle lighting, etc. As described above with reference to FIG. 2, the actions may be detected through the use of any suitable detection methods, including, but not limited to, sensors 245, 251, 252, 253, 265, 275 and 285. According to an exemplary embodiment, a user-actuated switch may comprise any suitable means for sending a signal to the control unit (e.g., an interrupt switch, a trip/odometer, a button configured to select from among a plurality or data to be displayed on display 176, a navigation system control, a hazard switch, a video system control, an audio/radio control, etc.). After interrupting the animation sequence, control unit 220 causes in-vehicle display 105 to expedite the animation sequence and/or display the final state of the animation sequence (e.g., normal operation at step 512) which may be a display of currently sensed parameters and/or information.

Control unit 220 may perform the method of bypassing the animation sequence in software or hardware. According to an exemplary embodiment shown in FIG. 4A, control unit 220a comprises a processor 550a, memory 560a, a set of machine-executable instructions stored in memory 560a and a communication interface 580a configured to communicate over vehicle communication bus 230 (FIG. 2) with in-vehicle displays 110, 120, 130 (FIGS. 1, 2A, 2B, 2C). Control unit 220a is configured communicate with the in-vehicle display, which may comprise a separate microprocessor, memory and software from control unit 220a.

Figure 4A:
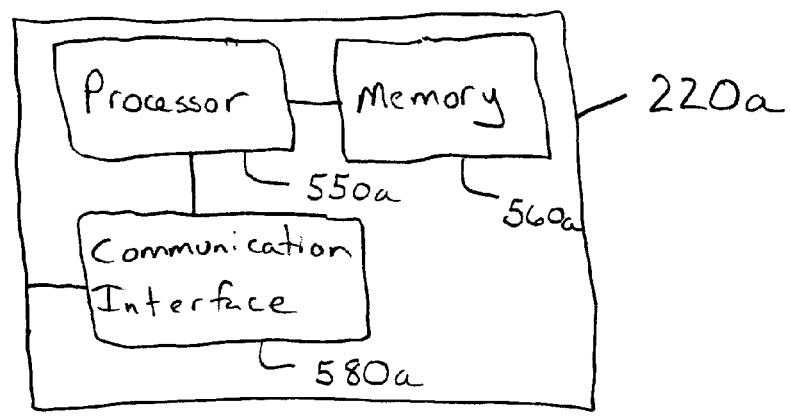
FIG. 4A is a block diagram of a control unit configured to control a vehicle system according to an exemplary embodiment.
Figure 4B:
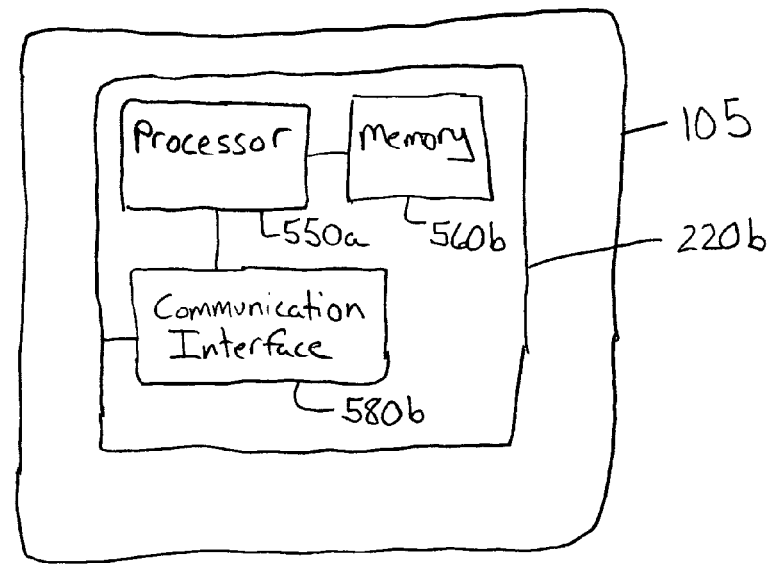
FIG. 4B is a block diagram of a control unit configured to control a vehicle system according to an exemplary embodiment.

According to an exemplary embodiment shown in FIG. 4B, control unit 220b comprises processor 550b, memory 560b, a set of machine executable instructions stored in memory 560b, and a communication interface 580b configured to communicate over vehicle communication bus 230 (FIG. 2) with in-vehicle displays 110, 120, 130 (FIGS. 1, 2A, 2B, 2C). According to various exemplary embodiments, the control unit may be configured to communicate with vehicle displays according to any suitable configuration (e.g., wires, wireless, etc.). In-vehicle display 105 comprises processor 550b and memory 560b. As shown in FIG. 4B, the machine executable instructions configured to bypass the animation sequence are stored in memory 560b of in-vehicle display 105 (e.g., an instrument cluster, a center stack, an overhead display, a mirror display, etc.) and utilize processor 550b and memory 560b of in-vehicle display 105 (e.g., the control unit is not a separate device from the in-vehicle display and is integrated into the hardware and/or software of the in-vehicle display or other vehicle system such as brake system, engine control system, navigation system, mirror system, etc.). According to the description of steps presented herein, the machine-executable instructions may be configured to start the animation sequence at vehicle start-up, bypass the animation sequence in response to a user-initiated input, and display the final state of the animation sequence.

Referring back to FIG. 3, the final state of the animation sequence (e.g., normal operation at step 512) may comprise displaying vehicle data after the animation sequence has performed its complete process and has ended (e.g., displaying the actual real-time data and parameters). The final display may comprise any type of vehicle data, measured value, and/or other information. With reference to the sensors and systems of FIGS. 2A, 2B, 2C, the data, values and/or information may be communicated from a respective sensor and/or system to a corresponding vehicle system. The corresponding vehicle system may then communicate the data, values and/or information over communication bus 230 to control unit 220 through communication interface 580a, 580b (FIGS. 4A, 4B). According to various exemplary embodiments, the current state of data, measured values, and/or other information displayed after the animation sequence is bypassed (or completed, in the event of no interrupt signal being received) may comprise engine revolutions per minute, engine oil temperature, oil level, fuel level, gear shift information, vehicle climate information, navigation information, video displays, etc.

It should be noted that although flow charts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the systems and methods described herein. It is to be understood that any method steps as recited herein (e.g., in the claims) may be performed by a computing device based on input by a user.

The description above is made with reference to drawings. These drawings illustrate certain details of specific embodiments that implement the systems and methods and programs of the exemplary embodiments. However, describing the embodiments with drawings should not be construed as imposing any limitations associated with features shown in the drawings. The present embodiments contemplate methods, systems and program products on any machine-readable media for accomplishing operations. The embodiments may be implemented using an existing computer processor, or by a special purpose computer processor incorporated for this or another purpose or by a hardwired system.

As noted above, exemplary embodiments include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Exemplary embodiments may be described in the general context of method steps which may be implemented in one embodiment by a program product including machine-executable instructions, such as program code, for example in the form of program modules executed by machines. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

An exemplary system for implementing the overall systems and methods or portions of the systems and methods might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The foregoing detailed description has been presented for purposes of illustration and description. It is not intended to be exhaustive or to limit the precise form disclosed, and modifications and variations are possible in light of the above teachings or may be acquired from practice. The embodiments were chosen and described in order to explain the principals of the claimed systems and methods and their practical application to enable one skilled in the art to utilize the systems and methods in various embodiments and with various modifications as are suited to the particular use contemplated.

What is claimed is:

1. A method for bypassing an animation sequence of a vehicle display system, the method comprising:
   including an in-vehicle display;
   starting the animation sequence at the in-vehicle display;
   interrupting the animation sequence in response to a user-initiated input; and
   displaying a final state of the animation sequence.

2. The method of claim 1, wherein the in-vehicle display comprises at least one of an instrument cluster, a center stack display, and an overhead display.

3. The method of claim 1, wherein the animation sequence is configured to begin at vehicle start-up.

4. The method of claim 1, wherein displaying the final state of the animation sequence comprises displaying actual vehicle data on the in-vehicle display.

5. The method of claim 4, wherein displaying the final state of the animation sequence comprises displaying current measured values from one or more vehicle systems, the measured values comprising one or more of:
   engine revolutions per minute;
   engine temperature;
   oil level;
   fuel level;
   gear shift information;
   radio station information;
   vehicle climate information;
   trip information; and
   video displays.

6. The method of claim 1, wherein the animation sequence comprises two or more events sequentially performed at the in-vehicle display.

7. The method of claim 6, wherein an event comprises at least one of movement of a gauge pointer, lighting of a gauge, displaying numerical data indicating a vehicle condition, a mirror display, displaying indicia on a center stack, and displaying indicia on an overhead display.

8. The method of claim 1, wherein the user-initiated input is performed to control vehicle motion.

9. The method of claim 8, wherein the user-initiated input comprises one or more of:
   depressing a brake pedal;
   depressing a clutch;
   releasing an emergency brake;
   maneuvering a gear shift;
   turning a steering wheel; and
   depressing an acceleration pedal.

10. The method of claim 1, wherein the user-initiated input comprises actuation of a user-actuated switch.

11. The method of claim 10, wherein the user-initiated input comprises one or more of:
    turning on vehicle lighting;
    actuating a trip/odometer;
    actuating a hazard switch;
    adjusting a navigation display system control;
    adjusting an audio control;
    adjusting a video control; and
    actuating an information control.

12. A method for bypassing an animation sequence of a vehicle display system, the method comprising:
    including an in-vehicle display;
    providing on the in-vehicle display a sequence of animations ending with a display of sensed vehicle data; and expediting the display of the sensed vehicle data in response to a user-initiated input.

13. The method of claim 12, wherein the display of the sensed vehicle data is expedited by skipping at least one animation in the sequence of animations.

14. The method of claim 13, wherein the display of the sensed data is expedited by displaying the sensed vehicle data upon receipt of the user-initiated input.

15. A vehicle display system, comprising:
an in-vehicle display configured to display an animation sequence; and
a control unit configured to control the display and to interrupt the animation sequence in response to a user-initiated input;
wherein the control unit is further configured to initiate the display of a final state of the animation sequence in response to the user-initiated input.

16. The vehicle display system of claim 15, wherein the in-vehicle display comprises at least one of an instrument cluster, a center stack display, and an overhead display.

17. The vehicle display system of claim 15, wherein displaying the final state of the animation sequence comprises displaying actual vehicle data on the in-vehicle display.

18. The vehicle display system of claim 15, wherein the user-initiated input is performed to control vehicle motion.

19. The vehicle display system of claim 15, wherein the user-initiated input comprises actuation of a user-actuated switch.

20. The method of claim 1, further comprising:
displaying the current state of data, measured values, and/or other information after interrupting the animation sequence in response to a user-initiated input and before displaying the final state of the animation sequence.

21. The method of claim 12, further comprising:
displaying the current state of data, measured values, and/or other information after providing the in-vehicle display and before expediting the display of the sensed vehicle data in response to the user-initiated input.

22. A control system for an in-vehicle display system that includes a vehicle display, the control system comprising:
an output coupled to the vehicle display; and
a control unit configured to control the vehicle display and to interrupt the animation sequence in response to a user-initiated input;
wherein the control unit is further configured to initiate the display of a final state of the animation sequence and a sensed vehicle data in response to the user-initiated input.

23. The control system of claim 22, wherein the control unit is further configured to display the current state of data, measured values, and/or other information after interrupting the animation sequence and before displaying the final state of the animation sequence and/or the sensed vehicle data in response to the user-initiated input.

* * * * *